United States Patent [19]

Himeno et al.

[11] Patent Number: 5,527,888
[45] Date of Patent: Jun. 18, 1996

[54] THIOPHENE-TYPE MONOAZO DYES

[75] Inventors: Kiyoshi Himeno; Toshio Hihara; Ryouichi Sekioka, all of Kitakyushu, all of Japan

[73] Assignee: Dystar Japan Ltd., Osaka, Japan

[21] Appl. No.: 399,660

[22] Filed: Mar. 7, 1995

[30] Foreign Application Priority Data

| Mar. 8, 1994 | [JP] | Japan | 6-064656 |
| Apr. 12, 1994 | [JP] | Japan | 6-098043 |
| Apr. 21, 1994 | [JP] | Japan | 6-105896 |
| Apr. 26, 1994 | [JP] | Japan | 6-110448 |

[51] Int. Cl.$^6$ ........................ C09B 29/033; C09B 29/09; D06P 3/36
[52] U.S. Cl. ................. 534/794; 534/753; 534/788; 534/791; 8/922
[58] Field of Search ...................... 534/788, 791, 534/794, 753; 8/922

[56] References Cited

U.S. PATENT DOCUMENTS

| 3,840,519 | 10/1974 | Hahn et al. | 534/732 |
| 4,079,050 | 3/1978 | Baird et al. | 534/794 X |
| 4,564,673 | 1/1986 | Niwa et al. | 534/794 X |
| 5,283,326 | 2/1994 | Hansen et al. | 534/794 X |
| 5,340,930 | 8/1994 | Himeno et al. | 534/794 X |

FOREIGN PATENT DOCUMENTS

| 58-89653 | 5/1983 | Japan | 534/794 |
| 58-101157 | 6/1983 | Japan | 534/794 |
| 1394365 | 5/1975 | United Kingdom | 534/753 |
| 1465941 | 3/1977 | United Kingdom | 534/753 |

OTHER PUBLICATIONS

Dyes For Synthetic Fibres, pp. 324–325 (No date available).

*Primary Examiner*—Fiona T. Powers
*Attorney, Agent, or Firm*—Oblon, Spivak, McClelland, Maier & Neustadt

[57] ABSTRACT

A monoazo dye of the following formula (I):

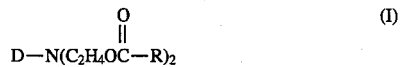

wherein R is phenyl, phenoxy or benzyl, and D is a group of the formula (D1), (D2), (D3) or (D4):

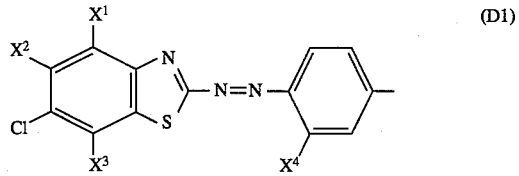

wherein each of $X^1$, $X^2$ and $X^3$, which are independent of one another, is hydrogen or chlorine, $X^4$ is hydrogen, chlorine, methyl or —NHCOR$^1$, wherein $R^1$ is $C_{1-4}$ alkyl or phenyl;

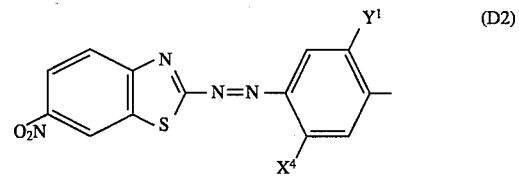

wherein $X^4$ is as defined above, $Y^1$ is hydrogen, chlorine or $C_{1-4}$ alkoxy;

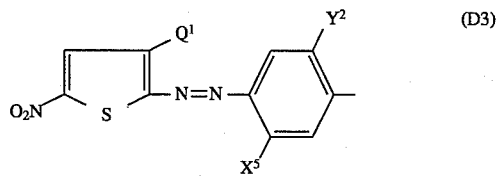

wherein $X^5$ is hydrogen, halogen, methyl or —NHZ, wherein Z is $C_{1-4}$ alkylsulfonyl, $C_{1-4}$ alkylcarbonyl, phenylsulfonyl, phenylcarbonyl, $C_{1-2}$ alkoxy $C_{1-2}$ alkylcarbonyl or aminocarbonyl, $Y^2$ is hydrogen, methyl or $C_{1-2}$ alkoxy, and $Q^1$ is cyano or $C_{1-4}$ alkylcarbonyl;

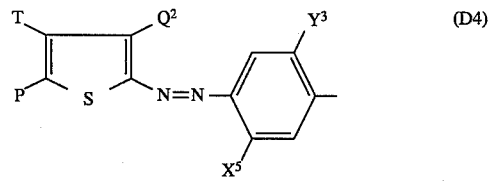

wherein P is formyl, nitro or cyano, $Q^2$ is cyano or nitro, T is halogen, methyl, phenyl or methylsulfonyl, $X^5$ is as defined above, and $Y^3$ is hydrogen or $C_{1-2}$ alkoxy. The dyes of the formula (I) are useful for dyeing polyester fibers, particularly fine denier polyester fibers.

11 Claims, No Drawings

THIOPHENE-TYPE MONOAZO DYES

The present invention relates to water-insoluble monoazo dyes, particularly monoazo dyes suitable for dyeing polyester fibers. More particularly, it relates to red, blue or reddish purple monoazo dyes suitable for dyeing fine denier polyester fibers.

Recently polyester fibers have remarkably advanced toward finer fibers to provide textiles of high added values having comfortable touch or high quality, and various fine denier fibers of less than 0.3 d, so-called ultramicro fibers, have been developed and extensively used. However, when ultramicro fibers having small diameters are dyed with conventional dyes, there is a problem that the wet color fastness such as color fastness to washing substantially decreases.

The object of the present invention is to provide a red, blue or reddish purple disperse dye capable of giving dyed products having not only good color fastness to washing but also excellent color fastnesses to perspiration (alkali).

The present invention provides a monoazo dye of the following formula (I):

wherein R is phenyl, phenoxy or benzyl, and D is a group of the formula (D1), (D2), (D3) or (D4):

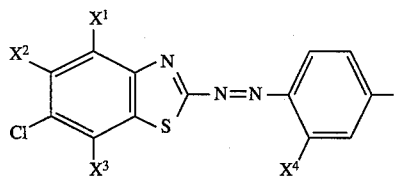

wherein each of $X^1$ $X^2$ and $X^3$ which are independent of one another, is hydrogen or chlorine, $X^4$ is hydrogen, chlorine, methyl or —NHCOR$^1$ wherein R$^1$ is $C_{1-4}$ alkyl or phenyl;

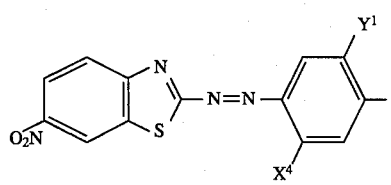

wherein $X^4$ is as defined above, $Y^1$ is hydrogen, chlorine or $C_{1-4}$ alkoxy;

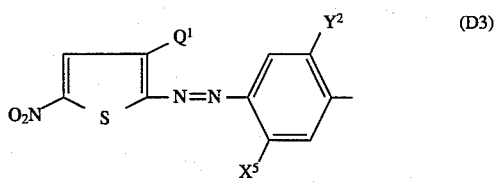

wherein $X^5$ is hydrogen, halogen, methyl or —NHZ, wherein Z is $C_{1-4}$ alkylsulfonyl, $C_{1-4}$ alkylcarbonyl, phenylsulfonyl, phenylcarbonyl, $C_{1-2}$ alkoxy $C_{1-2}$ alkylcarbonyl or aminocarbonyl, $Y^2$ is hydrogen, methyl or $C_{1-2}$ alkoxy, and $Q^1$ is cyano or $C_{1-4}$ alkylcarbonyl;

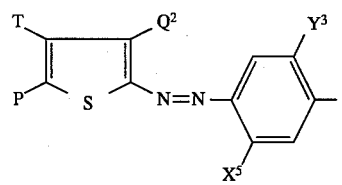

wherein P is formyl, nitro or cyano, $Q^2$ is cyano or nitro, T is halogen, methyl, phenyl or methylsulfonyl, $X^5$ is as defined above, and $Y^3$ is hydrogen or $C_{1-2}$ alkoxy. Now, the present invention will be described in detail.

The monoazo dye of the above formula (I) covers the following four types of monoazo dyes represented by the formulae (I-1), (I-2), (I-3) and (I-4):

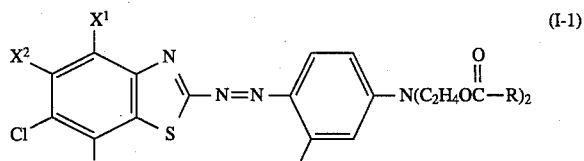

wherein $X^1$ $X^2$ $X^3$ $X^4$ and R are as defined above;

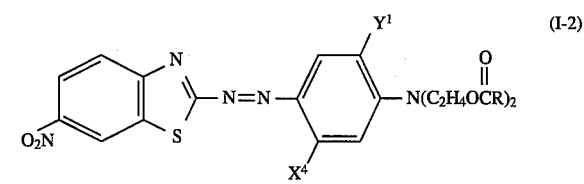

wherein $X^4$ $Y^1$ and R are as defined above;

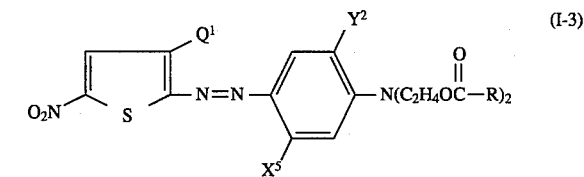

wherein $X^5$ $Y^2$ $Q^1$ and R are as defined above;

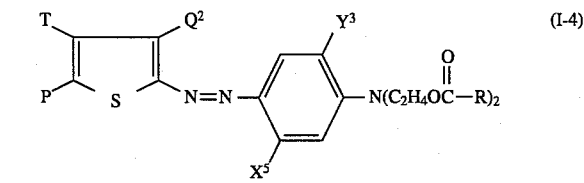

wherein P, $Q^2$, T, $X^5$, $Y^3$ and R are as defined above.

In the formulae (I-1) and (I-2), when $X^4$ is —NHCOR$^1$, $C_{1-4}$ alkyl for R$^1$ is linear or branched $C_{1-4}$ alkyl such as methyl, ethyl, n-propyl, i-propyl or n-butyl.

In the formulae (I-3) and (I-4), halogen for T or $X^5$ is chlorine or bromine, preferably chlorine. When $X^5$ is —NHZ, $C_{1-4}$ alkylsulfonyl for Z is linear or branched alkylsulfonyl such as methylsulfonyl, ethylsulfonyl, n-propylsulfonyl, i-propylsulfonyl, n-butylsulfonyl or secbutylsulfonyl.

As $C_{1-4}$ alkylcarbonyl, $C_{1-4}$ linear or branched alkylcarbonyl such as methylcarbonyl, ethylcarbonyl, n-propylcarbonyl, i-propylcarbonyl, n-butylcarbonyl or i-butylcarbonyl may be mentioned.

Among them, $C_{1-2}$ alkylsulfonyl and $C_{1-2}$ alkylcarbonyl are particularly preferred. As $C_{1-2}$ alkoxy $C_{1-2}$ alkylcarbonyl for Z, methoxymethylcarbonyl, ethoxymethylcarbonyl, methoxyethylcarbonyl or ethoxyethylcarbonyl may be mentioned. Particularly preferred is methoxymethylcarbonyl. As $C_{1-2}$ alkoxy for $Y^2$ or $Y^3$, methoxy or ethoxy may be mentioned In the formula (I-3), as $C_{1-4}$ alkylcarbonyl for $Q^1$, methylcarbonyl, ethylcarbonyl, n-propylcarbonyl or n-butylcarbonyl may be mentioned. Particularly preferred is $C_{1-2}$ alkylcarbonyl.

Among the dyes of the present invention represented by the formula (I), the following dyes (1) to (5) are preferred:

(1) a dye of the formula (I-1), wherein $X^1$ is hydrogen, at least one of $X^2$ and $X^3$ is chlorine, —NHCOR$^1$ is acetylamino or benzoylamino, and R is phenyl, which is represented by the following formula (I-1-1):

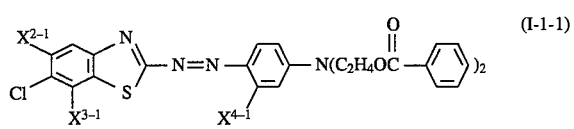

wherein one of $X^{2-1}$ and $X^{3-1}$ is chlorine, the other is hydrogen, and $X^{4-1}$ is acetylamino or benzoylamino;

(2) a dye of the formula (I-1), wherein $X^1$ is chlorine, $X^2$ and $X^3$ are hydrogen, —NHCOR$^1$ is acetylamino, and R is phenyl, which is represented by the following formula (I1-2);

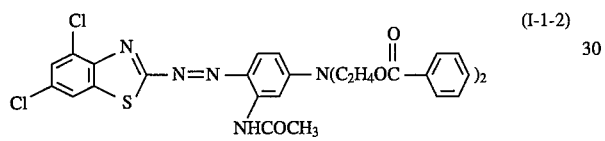

(3) a dye of the formula (I-2) wherein $X^4$ is hydrogen, methyl or $C_{1-2}$ alkylcarbonylamino, $Y^1$ is hydrogen, and R is phenyl, especially a dye of the formula (I-2) wherein $X^4$ and $Y^1$ are hydrogen, and R is phenyl, which is represented by the following formula (I-2-1);

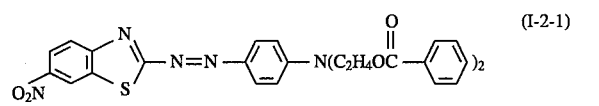

(4) a dye of the formula (I-3) wherein $X^5$ is $C_{1-2}$ alkylcarbonylamino or methoxymethylcarbonylamino, $Y^2$ is hydrogen, $Q^1$ is cyano or methylcarbonyl, and R is phenyl;

(5) a dye of the formula (I-4) wherein $X^5$ is $C_{1-2}$ alkylcarbonylamino or methoxymethylcarbonylamino, $Y^3$ is hydrogen, R is phenyl, P is formyl, $Q^2$ is cyano, and T is halogen.

The monoazo dye of the formula (I-1) is prepared, for example, by diazotizing an amine of the following formula

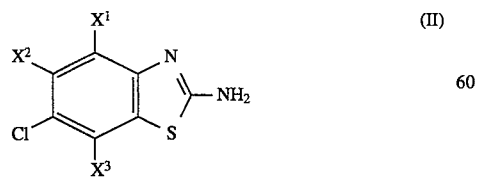

wherein $X^1$ $X^2$ and $X^3$ are as defined above, by a conventional method, followed by coupling with an aniline of the following formula (III):

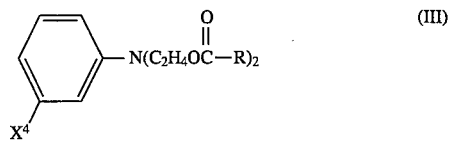

wherein $X^4$ and R are as defined above. The monoazo dye of the formula (I-2) is prepared, for example, by diazotizing 2-amino-6-nitrobenzothiazole by a conventional method, followed by coupling with an aniline of the following formula (IV):

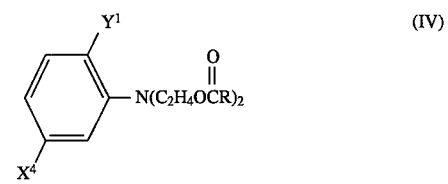

wherein $X^4$, $Y^1$ and R are as defined above.

The monoazo dye of the formula (I-3) is prepared, for example, by diazotizing an amine of the following formula

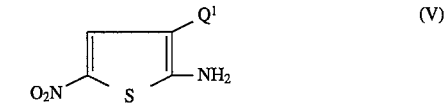

wherein $Q^1$ is as defined above, by a conventional method, followed by coupling with an aniline of the following formula (VI):

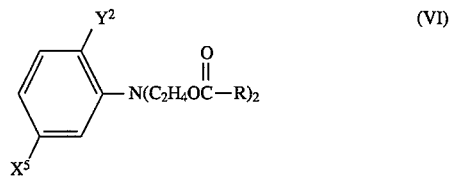

wherein $X^5$, $Y^2$ and R are as defined above. The monoazo dye of the formula (I-4) is prepared, for example, by diazotizing an amine of the following formula (VII):

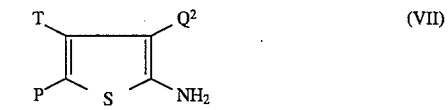

wherein P, $Q^2$ and T are as defined above, by a conventional method, followed by coupling with an aniline of the following formula (VIII):

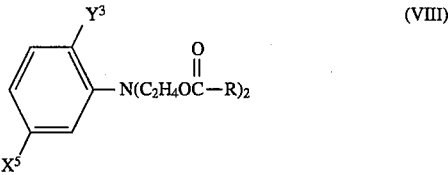

wherein $X^5$, $Y^3$ and R are as defined above.

Textile materials to which the monoazo dye of the present invention is applicable, include polyester fibers made of polyethylene terephthalate, polybutylene terephthalate or a polycondensate of terephthalic acid and 1,4-bis-(hydroxymethyl) cyclohexane, polyamide fibers made of nylon and the like, and fiber blend products such as blended yarn fabrics and union cloths comprising natural fibers such as cotton, silk and wool fibers and the above mentioned polyester fibers.

Particularly, among polyester fibers, not only ordinary polyester fibers (regular denier fibers) but also microfibers (fine denier fibers, which are less than 1 d) and ultramicro fibers (which are less than 0.3 d) may be mentioned as fibers which can successfully be dyed with the monoazo dye of the present invention.

When the monoazo dye of the present invention is used in dyeing, the monoazo dye of the formula (I) is dispersed in an aqueous medium by means of a dispersing agent in the usual way to prepare a dye bath for dyeing or a printing paste for textile printing.

For example, in the case of dyeing, polyester fibers and fiber mixture products such as blended yarn fabrics of union cloth product comprising polyester fibers can be dyed with good color fastness by common dyeing methods, such as a high temperature dyeing method, a carrier dyeing method and a thermosol dyeing method. In some cases, the addition of an acidic substance to the dyeing bath may result in more successful dyeing.

Dyed products obtained by dyeing or textile printing with the monoazo dye of the present invention are excellent in not only color fastness to washing but also various color fastnesses such as color fastnesses to perspiration (alkali), to sublimation and to water. Further, even if the dyed produces are further processed, no substantial decrease in the wet color fastness occurs.

The monoazo dye of the present invention may be used in combination with similar or other types of dyes.

Now, the present invention will be described in further detail with reference to Examples. However, it should be understood that the present invention is by no means restricted by such specific Examples.

EXAMPLE 1

0.025 g of a 1:1 monoazo dye mixture of the monoazo dyes of the following formulae (I-1-3) and (I-1-4):

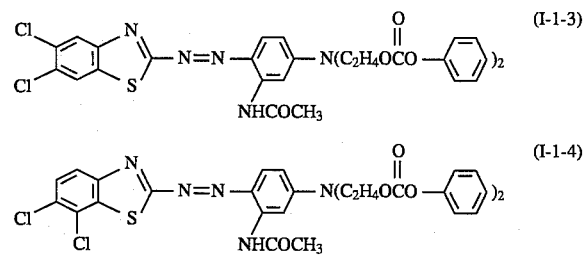

which are covered by the formula (I-1) wherein $X^4$ is —NHCOCH$_3$ and R is phenoxy, was dispersed in 200 ml of water containing 0.025 g of a naphthalenesulfonic acid-formaldehyde condensate and 0.025 g of a sulfuric acid ester of a higher alcohol to prepare a dye bath. In the dye bath, 10 g of a union cloth comprising polyester fibers of 2d and 0.01 d was immersed for dyeing at 135° C. for 30 minutes. After the dyeing, the cloth was subjected to soaping, washed with water and dried, whereby a brilliant red well-dyed cloth was obtained with the different denier polyester fibers dyed with the same color and the same color strength. The color fastness to washing of the union cloth dyed with the dye mixture was as excellent as 4–5 grade.

The color fastness to washing was measured in accordance with the AATCC 2A method and evaluated by the degree of staining on a nylon cloth.

The dye mixture used in this Example was prepared as follows. 4.4 g of a 1:1 mixture of 5,6-dichloroaminobenzothiazole and 6,7-dichloroaminobenzothiazole was dissolved in 80 g of a 50% sulfuric acid aqueous solution at 80° C. and then cooled to 0° C. Then, 6.5 g of a 43% nitrosylsulfuric acid was added to the solution at 0° C., and the solution was stirred for 2 hours to obtain a diazo liquid.

After 9.0 g of N,N-diphenoxycarbonyloxyethyl-m-acetylaminoaniline was dissolved in 200 ml of methanol, the diazo liquid was dropwise added thereto at 0° to 5° C. followed by stirring for 2 hours. The product was collected by filtration, washed with water and dried to obtain the desired dye mixture. The wavelength at the maximum absorption of the dye mixture ($\lambda_{max}$: in acetone) was 530 nm.

COMPARATIVE EXAMPLE 1

The compound having the same basic chemical structure as represented by the formula (I-1) wherein $X^4$ is —NHCOCH$_3$ and R is ethoxy (dye used in Example 1 in Japanese Unexamined Patent Publication No. 255601/1993), was synthesized in accordance with the method in Example 1, and an ultramicro fiber-union cloth was dyed therewith. The dyed cloth was evaluated in the same manner as in Example 1. The color fastness to washing of the dyed cloth was as poor as 3 grade.

EXAMPLES 2 TO 25

The dyes shown in Tables 1 and 2 were synthesized, and ultramicro fiber union cloths were dyed therewith. The color fastnesses to washing of the dyed cloths were measured in the same manner as in Example 1. The results are shown in Tables 1 and 2.

TABLE 1
The 1:1 mixture of the dyes of the formulae (I-1-5) and (I-1-6)
(I-1-5)
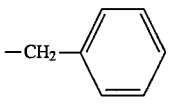
(I-1-6)
| Example | −X⁴ | −R | $\lambda_{max}$ (nm; in Acetone) | Color fastness to washing |
|---|---|---|---|---|
| 2 | −NHCOCH₃ | 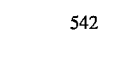 | 543 | 4–5 |
| 3 | −NHCOCH₃ | −CH₂− | 545 | 4–5 |
| 4 | −NHCO− | 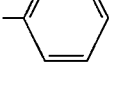 | 542 | 4–5 |
| 5 | −NHCOC₂H₅ |  | 542 | 4–5 |
| 6 | −NHCOC₃H₇(n) | 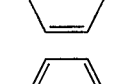 | 542 | 4–5 |
| 7 | −NHCOC₄H₉(n) | 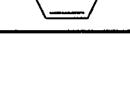 | 542 | 4–5 |
| 8 | −Cl |  | 504 | 4–5 |
| 9 | −CH₃ |  | 526 | 4–5 |
| 10 | −H |  | 514 | 4–5 |

TABLE 2
| Example | $-X^1$ | $-X^2$ | $-X^3$ | $-X^4$ | $-R$ | $\lambda_{max}$ (nm: in Acetone) | Color fastness to washing |
|---------|--------|--------|--------|--------|------|----------------------------------|---------------------------|
| 11 | $-Cl$ | $-H$ | $-H$ | $-NHCOCH_3$ | 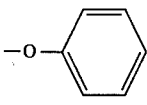 | 546 | 4–5 |
| 12 | $-Cl$ | $-H$ | $-H$ | $-NHCOCH_3$ | $-O-$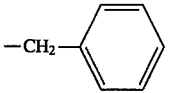 | 544 | 4–5 |
| 13 | $-Cl$ | $-H$ | $-H$ | $-NHCOCH_3$ | $-CH_2-$ | 547 | 4–5 |
| 14 | $-Cl$ | $-H$ | $-H$ | $-Cl$ |  | 507 | 4–5 |
| 15 | $-Cl$ | $-H$ | $-H$ | $-H$ |  | 517 | 4–5 |
| 16 | $-Cl$ | $-H$ | $-H$ | $-CH_3$ |  | 529 | 4–5 |
| 17 | $-H$ | $-H$ | $-H$ | $-NHCOCH_3$ |  | 524 | 4 |
| 18 | $-H$ | $-H$ | $-H$ | $-Cl$ |  | 500 | 4 |
| 19 | $-H$ | $-H$ | $-H$ | $-H$ |  | 510 | 4 |
| 20 | $-H$ | $-H$ | $-H$ | $-CH_3$ | 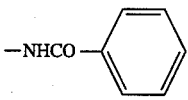 | 521 | 4 |
| 21 | $-H$ | $-H$ | $-H$ | $-NHCO-$ |  | 523 | 4–5 |
| 22 | $-H$ | $-H$ | $-H$ | $-NHCOC_3H_7(n)$ |  | 525 | 4–5 |
| 23 | $-Cl$ | $-Cl$ | $-H$ | $-NHCOCH_3$ |  | 532 | 4–5 |

TABLE 2-continued

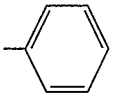

| Example | $-X^1$ | $-X^2$ | $-X^3$ | $-X^4$ | $-R$ | $\lambda_{max}$ (nm: in Acetone) | Color fastness to washing |
|---|---|---|---|---|---|---|---|
| 24 | $-Cl$ | $-Cl$ | $-H$ | $-H$ | 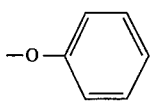 | 518 | 4–5 |
| 25 | $-Cl$ | $-Cl$ | $-H$ | $-H$ | 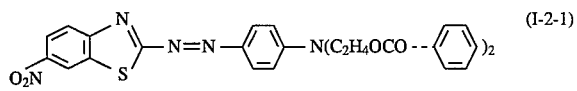 | 516 | 4–5 |

EXAMPLE 26

0.025 g of the monoazo dye of the following formula (I-2-1) which corresponds to the formula (I-2) wherein $X^4$ and $Y^1$ are hydrogen, and R is phenyl:

(I-2-1)

was dispersed in 200 ml of water containing 0.025 g of a naphthalenesulfonic acid-formaldehyde condensate and 0.025 g of a sulfuric acid ester of a higher alcohol to prepare a dye bath. 10 g of a union cloth comprising polyester fibers of 2 d and 0.01 d was immersed in the dye bath at 135° C. for 30 minutes for dyeing, and then the cloth was subjected to soaping, washed with water and dried, whereby a brilliant red well-dyed cloth was obtained with the different denier fibers dyed with the same color and the same color strength. The color fastness to washing of the union cloth dyed with the dye was as a excellent as 4 to 5 grade.

The color fastness to washing was measured in accordance with the AATCC 2A method and evaluated by the degree of staining on a nylon cloth.

The dye used in this Example Was prepared as follows.

10.0 g of 2-amino-6-nitrobenzothiazole was added to a liquid mixture of 45 g of 75% phosphoric acid, 16 g of acetic acid and 8.5 g of sulfuric acid, and 16 g of 43% nitrosylsulfuric acid was dropwise added thereto at −2° C. followed by stirring for 2 hours to obtain a diazo liquid.

After 19.0 g of N,N-diphenylcarbonyloxyethylaniline was dissolved in 800 ml of methanol, the diazo liquid was dropwise added thereto at 0° to 5° C. The mixture was stirred for 2 hours. The product was collected by filtration, washed with water and dried to obtain the desired dye. The wavelength at the maximum absorption of the dye (λmax: in acetone) was 530 nm.

COMPARATIVE EXAMPLE 2

The compound of the formula (I-2) wherein each of $X^4$ and $Y^1$ is hydrogen and R is methyl (as disclosed in Japanese Examined Patent Publication No. 16039/1961) was synthesized in accordance with the method in Example 26, and an ultramicro fiber union cloth was dyed therewith and the dyed cloth was evaluated in the same manner as in Example 26. The color fastness to washing of the dyed cloth was as poor as 3 grade.

EXAMPLES 27 TO 41

The dyes shown in Table 3 were synthesized in the same manner as in Example 26. Ultramicro fiber union cloths were dyed therewith, and the color fastness to washing was measured in the same manner as in Example 26.

The results are shown in Table 3.

TABLE 3

Structure: 6-nitrobenzothiazol-2-yl—N=N—(phenyl with Y¹, X⁴ substituents)—N(C₂H₄OCR)₂ where the N-substituent is $-N(C_2H_4OCR)_2$ with C=O.

| Example | $-X^4$ | $-Y^1$ | $-R$ | $\lambda_{max}$ (nm; in Acetone) | Color fastness to washing |
|---|---|---|---|---|---|
| 27 | $-H$ | $-H$ | $-CH_2-C_6H_5$ | 532 | 4–5 |
| 28 | $-H$ | $-H$ | $-O-C_6H_5$ | 528 | 4–5 |
| 29 | $-CH_3$ | $-H$ | $-C_6H_5$ | 542 | 4–5 |
| 30 | $-CH_3$ | $-H$ | $-CH_2-C_6H_5$ | 544 | 4–5 |
| 31 | $-CH_3$ | $-H$ | $-O-C_6H_5$ | 540 | 4–5 |
| 32 | $-Cl$ | $-H$ | $-C_6H_5$ | 520 | 4–5 |
| 33 | $-Cl$ | $-H$ | $-O-C_6H_5$ | 518 | 4–5 |
| 34 | $-H$ | $-Cl$ | $-C_6H_5$ | 510 | 4–5 |
| 35 | $-H$ | $-Cl$ | $-CH_2-C_6H_5$ | 508 | 4–5 |
| 36 | $-NHCOCH_3$ | $-H$ | $-C_6H_5$ | 550 | 4–5 |
| 37 | $-NHCOCH_3$ | $-H$ | $-O-C_6H_5$ | 548 | 4–5 |
| 38 | $-NHCOCH_3$ | $-H$ | $-CH_2-C_6H_5$ | 552 | 4–5 |

TABLE 3-continued

Structure:
O₂N—[benzothiazole]—N=N—[phenyl with Y¹ (top) and X⁴ (bottom)]—N(C₂H₄OCR)₂ (C=O)

| Example | -X⁴ | -Y¹ | -R | λ_max (nm; in Acetone) | Color fastness to washing |
|---|---|---|---|---|---|
| 39 | -NHCOC₃H₇(n) | -H | -O-phenyl | 550 | 4-5 |
| 40 | -NHCOC₃H₇(n) | -OCH₃ | -O-phenyl | 570 | 4-5 |
| 41 | -NHCOCH₃ | -OCH₃ | -phenyl | 572 | 4-5 |

EXAMPLE 42

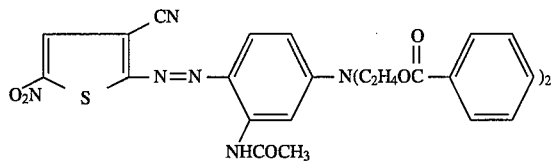

0.025 g of the monoazo dye of the above formula was dispersed in 200 ml of water containing 0.025 g of a naphthalenesulfuric acid-formaldehyde condensate and 0.025 g of a sulfuric acid ester of a higher alcohol to prepare a dye bath. 10 g of a union cloth comprising polyester fibers of 2 d and 0.01 d was immersed for dyeing at 135° C. for 30 minutes, and then the cloth was subjected to soaping, washed with water and dried, whereby a brilliant blue well-dyed cloth with the different denier fibers dyed in the same color and with the same color strength was obtained. The color fastness to washing of the union cloth dyed with the dye was as excellent as 4⁺ grade.

The color fastness to washing was measured by the AATCC 2A method and evaluated by the degree of staining on a nylon cloth.

The monoazo dye used in this Example was prepared as follows.

0.76 g of sodium nitrite was added to 5 g of sulfuric acid, and the resulting mixture was heated to 70° C. and then cooled to 5° C. A mixture of 1.4 g of propionic acid and 8.6 g of acetic acid was gradually added thereto, and the temperature was elevated to 15° C. and maintained at this level. After the solution was cooled to 0° C., 1.7 g of 2-amino-3-cyano-5-nitrothiophene and then 1.4 g of propionic acid and 8.6 g of acetic acid were added to the solution, and the resulting mixture was stirred at 5° C. for 75 minutes. To the mixture, the same amounts of propionic and acetic acid were added, and the mixture was further stirred at 5° C. for one hour.

Urea was added to the mixture to decompose the remaining nitrous acid, and the resulting diazonium salt solution was dropwise added to a solution of 4.5 g of N,N-dibenzoyloxyethylamino-m-acetoanilide in 200 ml of methanol at 0° to 5° C., and the solution was stirred for 2 hours. The desired dye was separated from the solution by filtration, washed with waster and dried.

The wavelength at the maximum absorption of the dye (λ_max: in acetone) was 606 nm.

COMPARATIVE EXAMPLE 3

The dye of the following formula:

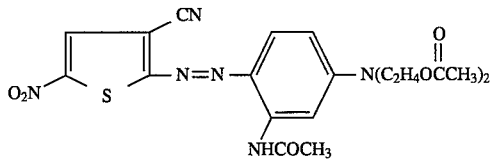

as disclosed in Example 80 in Japanese Examined Patent Publication No. 47214/1982, was evaluated in the same manner as in Example 42, and the color fastness to washing was as poor as 2 to 3 grade.

EXAMPLES 43 TO 74

The dyes shown in Table 4 were synthesized in accordance with the method in Example 42, and ultramicro fiber union cloths were dyed in the same manner as in Example 42.

The color fastness to washing of all the dyes were at least 4⁺ grade.

TABLE 4

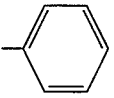

| Example | –Q¹ | –X⁵ | –Y² | –R | $\lambda_{max}$ (Acetone) | Hue of dyed cloth |
|---|---|---|---|---|---|---|
| 43 | –CN | –NHCOC$_2$H$_5$ | –H | 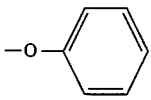 | 605 | moderate blue |
| 44 | –CN | –NHCOC$_4$H$_{9(n)}$ | –H | 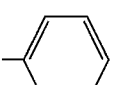 | 601 | moderate blue |
| 45 | –CN | –NHCOCH$_2$OCH$_3$ | –H | 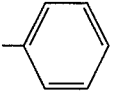 | 604 | moderate blue |
| 46 | –CN | –NHCOC$_2$H$_4$OC$_2$H$_5$ | –H | 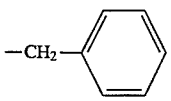 | 604 | moderate blue |
| 47 | –CN | –NHCOCH$_3$ | –OCH$_3$ | 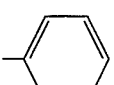 | 642 | bluish green |
| 48 | –CN | –CH$_3$ | –H | 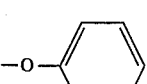 | 613 | reddish blue |
| 49 | –CN | –CH$_3$ | –H | 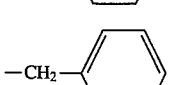 | 610 | reddish blue |
| 50 | –CN | –CH$_3$ | –H | 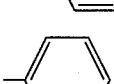 | 615 | reddish blue |
| 51 | –CN | –CH$_3$ | –OC$_2$H$_5$ | 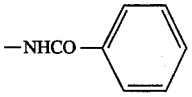 | 645 | bluish green |
| 52 | –CN | 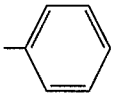 | –H | 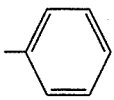 | 601 | moderate blue |
| 53 | –CN | –NHSO$_2$CH$_3$ | –H | 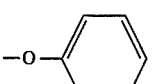 | 592 | moderate blue |
| 54 | –CN | –NHSO$_2$C$_2$H$_5$ | –H | 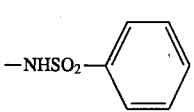 | 589 | moderate blue |
| 55 | –CN | 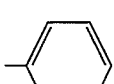 | –H |  | 588 | moderate blue |

TABLE 4-continued

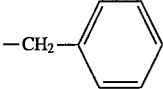

| Example | −Q¹ | −X⁵ | −Y² | −R | λ_max (Acetone) | Hue of dyed cloth |
|---|---|---|---|---|---|---|
| 56 | −CN | −NHCOC₃H₇(i) | −H | −CH₂−C₆H₅ | 607 | greenish blue |
| 57 | −CN | −NHCOC₃H₇(n) | −CH₃ | −C₆H₅ | 585 | dark blue |
| 58 | −CN | −Cl | −H | −C₆H₅ | 594 | reddish blue |
| 59 | −CN | −Cl | −H | −O−C₆H₅ | 591 | reddish blue |
| 60 | −CN | −Br | −H | −CH₂−C₆H₅ | 590 | reddish blue |
| 61 | −CN | −NHCONH₂ | −H | −C₆H₅ | 609 | greenish blue |
| 62 | −CN | −NHCONH₂ | −H | −O−C₆H₅ | 606 | greenish blue |
| 63 | −CN | −NHCONH₂ | −H | −CH₂−C₆H₅ | 611 | greenish blue |
| 64 | −CN | −CH₃ | −H | −C₆H₅ | 614 | reddish blue |
| 65 | −CN | −CH₃ | −CH₃ | −C₆H₅ | 595 | dark blue |
| 66 | −CN | −H | −H | −C₆H₅ | 604 | reddish blue |
| 67 | −CN | −H | −H | −O−C₆H₅ | 601 | reddish blue |

TABLE 4-continued

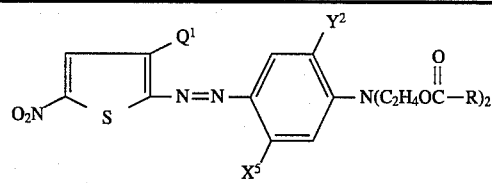

| Example | -Q¹ | -X⁵ | -Y² | -R | $\lambda_{max}$ (Acetone) | Hue of dyed cloth |
|---|---|---|---|---|---|---|
| 68 | -CN | -H | -OCH₃ | -C₆H₅ | 629 | moderate blue |
| 69 | -CN | -CH₃ | -OCH₃ | -C₆H₅ | 639 | greenish blue |
| 70 | -C(=O)-CH₃ | -CH₃ | -H | -C₆H₅ | 630 | reddish blue |
| 71 | -C(=O)-CH₃ | -NHCOCH₃ | -H | -C₆H₅ | 598 | moderate blue |
| 72 | -C(=O)-C₂H₅ | -NHCOCH₂OCH₃ | -H | -O-C₆H₅ | 596 | moderate blue |
| 73 | -C(=O)-C₂H₅ | -NHSO₂C₂H₅ | -OCH₃ | -CH₂-C₆H₅ | 624 | bluish green |
| 74 | -C(=O)-C₄H₉(n) | -NHCO-C₆H₅ | -OCH₃ | -C₆H₅ | 636 | bluish green |

EXAMPLE 75

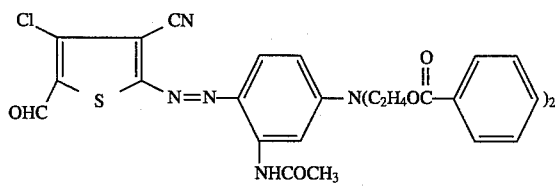

0.025 g of the monoazo dye of the above formula was dispersed in 200 ml of water containing 0.025 g of a naphthalenesulfuric acid-formaldehyde condensate and 0.025 g of a sulfuric acid ester of a higher alcohol to prepare a dye bath. 10 g of a union cloth comprising polyester fibers of 2 d and 0.01 d was immersed for dyeing at 135° C. for 30 minutes, and then the cloth was subjected to soaping, washed with water and dried, whereby a brilliant blue well-dyed cloth with the different denier fibers dyed in the same color and with the same color strength was obtained. The color fastness to washing of the union cloth dyed with the dye was as excellent as 4⁺ grade.

The color fastness to washing was measured by the AATCC 2A method and evaluated by the degree of staining on a nylon cloth.

The monoazo dye used in this Example was prepared as follows.

To a mixture of 15 g of glacial acetic acid/propionic acid (3:1) and 5.0 g of 85% sulfuric acid, 1.9 g of 2-amino-3-cyano-4-chloro-5-formylthiophene was added and then 3.2 g of nitrosylsulfuric acid (43%) was dropwise added at 0° to 5° C. The resulting solution was stirred at 0° to 5° C. for 4 hours.

Urea was added to the solution to decompose the residual nitrous acid, and the resulting solution was dropwise added to a solution of 4.5 g of N,N-dibenzoyloxyethylamino-m-acetoanilide in 200 ml of methanol at 0° to 5° C. The solution was stirred for 2 hours and filtered to collect the desired dye, and it was washed with water and dried.

The wavelength at the maximum absorption of the dye ($\lambda_{max}$: in acetone) was 590 nm.

COMPARATIVE EXAMPLE 4

The dye disclosed in Example 6 in Japanese Unexamined Patent Publication No. 266466/1986 of the following formula:

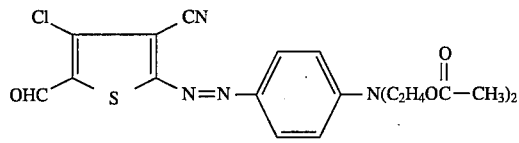

was evaluated in accordance with Example 75. As a result, the color fastness to washing was as poor as 2 to 3 grade.

EXAMPLES 76 TO 95

The dyes shown in Table 5 were synthesized in accordance with the method in Example 75, and ultramicro fiber union cloths were dyed in the same manner as in Example 75. The color fastnesses to washing were at least $4^+$.

TABLE 5

| Example | −P | −$Q^2$ | −T | −$X^5$ | −$Y^3$ | −R | $\lambda_{max}$ nm (Acetone) | Hue |
|---|---|---|---|---|---|---|---|---|
| 76 | −CHO | −CN | −Cl | −NHCOCH₃ | −H | −O−C₆H₅ | 576 | reddish blue |
| 77 | −CHO | −CN | −Cl | −NHCONH₂ | −H | −C₆H₅ | 593 | moderate blue |
| 78 | −CHO | −CN | −Cl | −NHCOC₂H₄OCH₃ | −H | −C₆H₅ | 592 | moderate blue |
| 79 | −CHO | −CN | −Cl | −H | −H | −CH₂−C₆H₅ | 573 | violet |
| 80 | −CHO | −CN | −Cl | −CH₃ | −H | −C₆H₅ | 584 | bluish violet |
| 81 | −CHO | −CN | −Cl | −Cl | −H | −O−C₆H₅ | 569 | violet |
| 82 | −CHO | −CN | −Cl | −NHCOCH₃ | −OCH₃ | −C₆H₅ | 622 | bluish green |
| 83 | −CHO | −NO₂ | −Cl | −NHSO₂CH₃ | −H | −C₆H₅ | 546 | violet |
| 84 | −CHO | −CN | −C₆H₅ | −CH₃ | −H | −C₆H₅ | 582 | bluish violet |
| 85 | −CHO | −CN | −C₆H₅ | −NHCOCH₃ | −H | −C₆H₅ | 592 | moderate blue |

TABLE 5-continued $$\underset{P}{\overset{T}{\underset{S}{\bigvee}}}\overset{Q^2}{\underset{}{}}-N=N-\underset{X^5}{\overset{Y^3}{\bigcirc}}-N(C_2H_4OC(=O)-R)_2$$

| Example | −P | −Q² | −T | −X⁵ | −Y³ | −R | λ_max nm (Acetone) | Hue |
|---------|-----|-----|-----|-----|-----|-----|------|------|
| 86 | −CHO | −CN | −Br | −NHSO₂−C₆H₅ | −H | −C₆H₅ | 572 | bluish violet |
| 87 | −CHO | −CN | −SO₂CH₃ | −NHCOC₄H₉ | −H | −C₆H₅ | 601 | moderate blue |
| 88 | −NO₂ | −CN | −Cl | −CH₃ | −H | −O−C₆H₅ | 614 | reddish blue |
| 89 | −NO₂ | −CN | −Cl | −NHCOCH₃ | −H | −C₆H₅ | 618 | moderate blue |
| 90 | −NO₂ | −CN | −Cl | −NHSO₂C₂H₅ | −OCH₃ | −C₆H₅ | 643 | bluish green |
| 91 | −NO₂ | −CN | −Br | −NHCOC₂H₄OC₂H₅ | −H | −O−C₆H₅ | 621 | moderate blue |
| 92 | −CN | −CN | −Cl | −CH₃ | −OC₂H₅ | −CH₂−C₆H₅ | 639 | bluish green |
| 93 | −CN | −CN | −CH₃ | −NHCO−C₆H₅ | −H | −C₆H₅ | 565 | violet |
| 94 | −CN | −CN | −CH₃ | −NHCOC₄H₉ | −OCH₃ | −C₆H₅ | 603 | reddish blue |
| 95 | −CN | −CN | −CH₃ | −Br | −H | −C₆H₅ | 539 | reddish violet |

The present invention provides dyes capable of dyeing polyester fibers with excellent color fastnesses to perspiration (alkali), to sublimation and to water. The present invention provides-disperse dyes capable of dyeing polyester ultramicro fibers which are difficult to dye, with red, blue or reddish violet with excellent color fastness.

We claim:
1. A monoazo dye of the following formula (I):

$$D-N(C_2H_4OC(=O)-R)_2 \qquad (I)$$

wherein R is phenyl, phenoxy or benzyl, and D is a group of the formula (D3) or (D4):

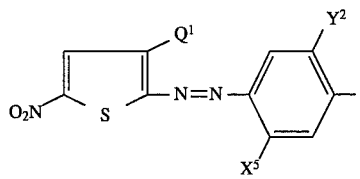

wherein $X^5$ is hydrogen, halogen, methyl or —NHZ, wherein Z is $C_{1-4}$ alkylsulfonyl, $C_{1-4}$ alkylcarbonyl, phenylsulfonyl, phenylcarbonyl, $C_{1-2}$ alkoxy $C_{1-2}$ alkylcarbonyl or aminocarbonyl, $Y^2$ is hydrogen, methyl or $C_{1-2}$ alkoxy, and $Q^1$ is cyano or $C_{1-4}$ alkylcarbonyl;

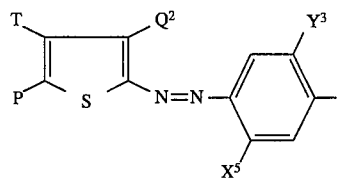

wherein P is formyl, nitro or cyano, $Q^2$ is cyano, T is halogen, methyl, phenyl or methylsulfonyl, $X^5$ is as defined above, and $Y^3$ is hydrogen or $C_{1-2}$ alkoxy.

2. The monoazo dye according to claim 1, which is represented by the following formula (I-3):

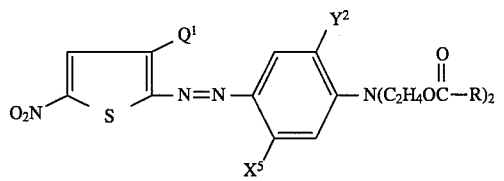

wherein $X^5$, $Y^2$, $Q^1$ and R are as defined above.

3. The monoazo dye according to claim 2, wherein $X^5$ is $C_{1-2}$ alkylcarbonylamino or methoxymethylcarbonylamino, $Y^2$ is hydrogen, $Q^1$ is cyano or methylcarbonyl, and R is phenyl.

4. The monoazo dye according to claim 1, which is represented by the following formula (I-4):

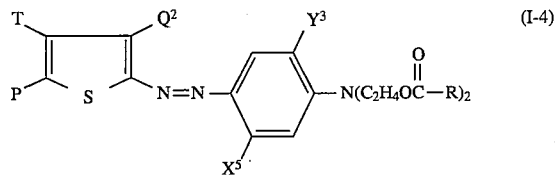

wherein P, $Q^2$, T, $X^5$, $Y^3$ and R are as defined above.

5. The monoazo dye according to claim 4, wherein $X^5$ is $C_{1-2}$ alkylcarbonylamino or methoxymethylcarbonylamino, $Y^3$ is hydrogen, R is phenyl, P is formyl, $Q^2$ is cyano, and T is halogen.

6. The monoazo dye according to claim 1, wherein $Q^1$ is cyano.

7. The monoazo dye according to claim 1, wherein R is phenyl.

8. The monoazo dye as claimed in claim 1, wherein R is phenoxy.

9. The monoazo dye as claimed in claim 1, wherein R is benzyl.

10. A method for dyeing polyester ultramicro fibers by applying thereto a monoazo dye as defined in claim 1.

11. Polyester ultramicro fibers dyed with the monoazo dye as defined in claim 1.

* * * * *